United States Patent
Dobbs, II

(10) Patent No.: US 10,986,084 B1
(45) Date of Patent: Apr. 20, 2021

(54) AUTHENTICATION DATA MIGRATION

(71) Applicant: MASSACHUSETTS MUTUAL LIFE INSURANCE COMPANY, Springfield, MA (US)

(72) Inventor: George Byron Dobbs, II, South Windsor, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 235 days.

(21) Appl. No.: 16/133,389

(22) Filed: Sep. 17, 2018

Related U.S. Application Data

(60) Provisional application No. 62/562,145, filed on Sep. 22, 2017.

(51) Int. Cl.
| | |
|---|---|
| *H04L 29/06* | (2006.01) |
| *H04L 9/32* | (2006.01) |
| *G06F 21/62* | (2013.01) |
| *G06F 21/60* | (2013.01) |
| *G06F 21/45* | (2013.01) |
| *G06F 16/21* | (2019.01) |
| *G06F 16/903* | (2019.01) |

(52) U.S. Cl.
CPC .......... *H04L 63/083* (2013.01); *G06F 16/214* (2019.01); *G06F 16/90344* (2019.01); *G06F 21/45* (2013.01); *G06F 21/604* (2013.01); *G06F 21/62* (2013.01); *H04L 9/3236* (2013.01); *H04L 63/102* (2013.01)

(58) Field of Classification Search
CPC ... H04L 63/083; H04L 63/102; H04L 9/3236; G06F 16/214; G06F 16/90344; G06F 21/604; G06F 21/45; G06F 21/62
See application file for complete search history.

(56) References Cited

U.S. PATENT DOCUMENTS

2007/0083917 A1* 4/2007 Peterson ................. H04L 63/08 726/5
2012/0124168 A1* 5/2012 Boerger ................ G06F 16/119 709/217
(Continued)

OTHER PUBLICATIONS

Gudisagar et al.; "Secure Data Migration between Cloud Storage Systems", 2017, IEEE, pp. 2208-2212. (Year: 2017).*
(Continued)

*Primary Examiner* — Matthew Smithers
(74) *Attorney, Agent, or Firm* — Foley & Lardner LLP

(57) ABSTRACT

Disclosed herein are embodiments of systems, methods, and products comprises an analytic server, which retains the old passwords during security system migration. The analytic server receives strings corresponding to passwords from an old system. When a user issues a login request after the system migration, the analytic server determines the input password and computes a second string based on the input password. By comparing the second string with the string received from the old system, the analytic server determines whether input password is correct. If the second string and the received string match, the analytic server determines that the input password is the actual password and replaces the received string with the input password. In this way, the analytic server obtains the actual password, which is the original password. As a result, the analytic server retains the old password during the system migration.

20 Claims, 2 Drawing Sheets

(56) References Cited

U.S. PATENT DOCUMENTS

| | | | | |
|---|---|---|---|---|
| 2012/0239936 | A1* | 9/2012 | Holtmanns | H04W 12/04 |
| | | | | 713/176 |
| 2014/0099933 | A1* | 4/2014 | Yerrabommanahalli | |
| | | | | H04W 12/04 |
| | | | | 455/418 |
| 2014/0289201 | A1* | 9/2014 | Chan | G06F 16/27 |
| | | | | 707/650 |
| 2014/0325622 | A1* | 10/2014 | Luk | H04L 63/0823 |
| | | | | 726/6 |
| 2016/0191497 | A1* | 6/2016 | Pietikainen | H04L 63/083 |
| | | | | 726/6 |
| 2016/0330177 | A1* | 11/2016 | Singleton, IV | G06F 21/554 |

OTHER PUBLICATIONS

Ni et al.; "Secure Outsourced Data Transfer with Integrity Verification in Cloud Storage", Jul. 2016, IEEE, pp. 1-6. (Year: 2016).*

* cited by examiner

AUTHENTICATION DATA MIGRATION

CROSS-REFERENCE TO RELATED APPLICATIONS

This application claims priority to U.S. Provisional Patent Application Ser. No. 62/562,145, entitled "Authentication Data Migration," filed Sep. 22, 2017, which is hereby incorporated by reference in its entirety.

TECHNICAL FIELD

This application relates generally to methods and systems for authentication data migration.

BACKGROUND

Out of consideration for cost saving or when the hardware is no longer suitable, desirable, and/or available, there may be a need for a computer system migration where data is transferred from one computer system to another. For example, a computer system migration may refer to transferring data from a mainframe computer to a more open system, such as a cloud computing platform. However, migrating from an old computer system to a new computer system could be inconvenient for the users. In some instances, the users may be required to reregister a new account with the new system. For example, users may need to change their authentication credentials and create a new set of authentication credentials with the new computer system because the old computer system may not be able to transfer the users' authentication credentials (e.g., password) to the new system due to technical challenges or security considerations. In typical security systems, passwords stored in the old system may be opaque to the new system. In other words, it is not always secure to directly transfer the passwords from the old system to the new system in plaintext. As a result, it may be difficult for the new system to authenticate the users.

As discussed above, in the existing and conventional methods, the new system may require the users to reregister to be authenticated. The new system may also create a new database to store the new passwords. Otherwise, whenever a user tries to log into the new system after the system migration, it may be required that the old system authenticates the user in the transition phase. In the meantime, the new system may capture the inputted account passwords, and save into a new database. Overtime, after all the users login, the new system may obtain their passwords, and retire the old system. In other words, there may be two different systems operating at the same time during the transition phase. These conventional methods and solutions have created several shortcomings and a new set of technical challenges. Requiring all the users to reregister would be inconvenient and waste the users' time, which may have negative impacts on the user experience. Requiring the old system to do authentication may create a need for a parallel run of both systems during the transition phase, which may be difficult for system maintenance. It may also be hard for customer service to deal with two different back-end systems.

SUMMARY

For the aforementioned reasons, there is a need for a secure system to completely retire the old system and rely entirely on the new system, while allowing the users to retain their old passwords. Discussed herein are systems and methods for processing the user passwords to compute a string representation for each password, exporting the strings to the new system, authenticating users using the strings at the new system to retire the old system, and retaining use of the old passwords in security system migration.

In one embodiment, a method comprises receiving, by a first server, from a second server, a set of strings corresponding to a plurality of users' authentication data, wherein each string corresponds to each user's authentication data and is a hash value generated by the second server based at least on each user's authentication data; receiving, by the first server, an authentication request from a user of the plurality of users, wherein the authentication request comprises at least a user identifier and authentication data; querying, by the first server from a database storing the set of strings received from the second server, a first string corresponding to the user's authentication data based on the user identifier; generating, by the first server, a second string corresponding to the user's authentication data by applying a hashing algorithm to the user's authentication data and a salt value associated with the user; comparing, by the first server, the first string and the second string to determine whether the first string matches the second string; and upon the first string matching the second string: authenticating, by the first server, the user by granting the user access to a user account associated with the user identifier; and replacing, by the first server, the first string with the user's authentication data in the database.

In another embodiment, a system comprises a second server; and a first server in communication with the second server and configured to: receive, from the second server, a set of strings corresponding to a plurality of users' authentication data, wherein each string corresponds to each user's authentication data and is a hash value generated by the second server based at least on each user's authentication data; receive an authentication request from a user of the plurality of users, wherein the authentication request comprises at least a user identifier and authentication data; query, from a database storing the set of strings received from the second server, a first string corresponding to the user's authentication data based on the user identifier; generate a second string corresponding to the user's authentication data by applying a hashing algorithm to the user's authentication data and a salt value associated with the user; compare the first string and the second string to determine whether the first string matches the second string; upon the first string matching the second string: authenticate the user by granting the user access to a user account associated with the user identifier; and replace the first string with the user's authentication data in the database.

It is to be understood that both the foregoing general description and the following detailed description are exemplary and explanatory and are intended to provide further explanation of the disclosed embodiments and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
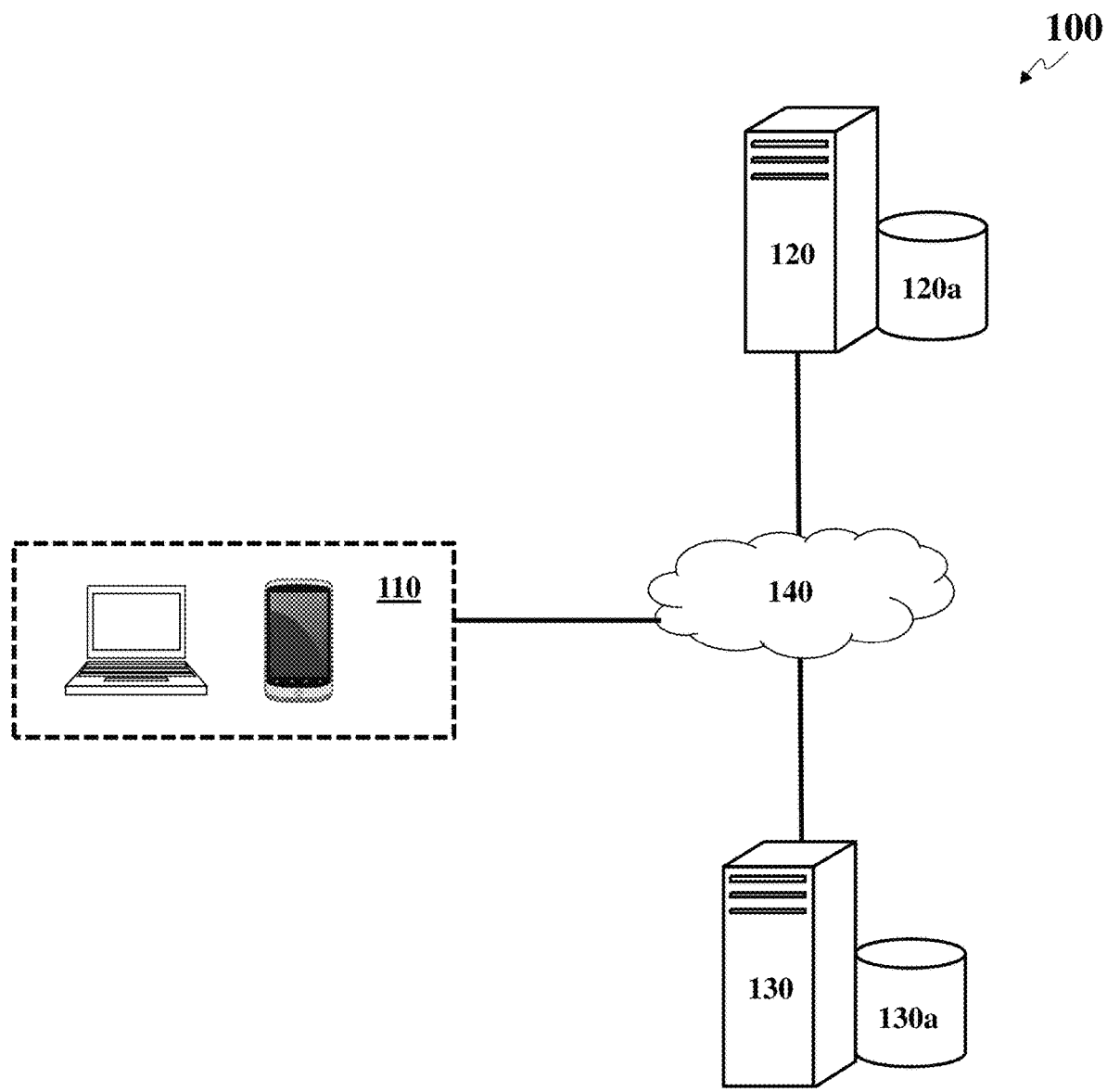
FIG. 1 illustrates a computer system for authentication data migration, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for authentication data migration, according to an embodiment. The system 100 may comprise a set of electronic client devices 110, an analytic server 130, a user account database 130a, an old system server 120, and an original user account database 120a associated with the old system server 120, that are connected with each other via hardware and software components of one or more networks 140 or another network similar but separate and distinct from the network 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The electronic client device 110 may be any computing device allowing a participant/user to interact with analytic server 130. The electronic client device 114) may be any computing device comprising a processor and non-transitory machine-readable storage medium allowing the electronic device 110 to perform the various tasks and processes when interacting with the analytic server 130. Examples of the computing device may include, but are not limited to, a desktop computer, a laptop, a personal digital assistant (PDA), a smartphone, a tablet computer, a smart watch, and the like.

The electronic client device 110 may execute an Internet browser or local application that accesses the analytic server 130 in order to issue requests or instructions. The electronic client device 110 may transmit credentials from client inputs to the analytic server 130, from which the analytic server 130 may authenticate the client and/or determine a client role. The electronic client device 110 may comprise any number of input devices configured to receive any number of data inputs, including various types of data inputs allowing for authentication (e.g., username, passwords, certificates, and biometrics).

The electronic client device 110 may be configured to communicate with the analytic server 130 through one or more networks 140, using wired and/or wireless communication capabilities. In operation, the electronic client device 110 may include a graphical user interface (GUI) that renders an interactive layout, schematic, or other elements for the client/user to input a request. For example, the user interface may include a text-based interface allowing the user to enter manual commands.

The analytic server 130 and the old system server 120 may be any computing device comprising a processor and other computing hardware and software components, configured to process the requests received from the electronic client device 110. Each of the analytic server 130 and the old system server 120 may be logically and physically organized within the same or different devices or structures, and may be distributed across any number of physical structures and locations (e.g., cabinets, rooms, buildings, cities). For some reasons (e.g., cost saving), the set of programs and/or applications run on the old system server 120 may be migrated to the analytic server 130, which acts as the new system server. In other words, the electronic client device 110 may be interacting with the old system server 120 before the system migration but with the analytic server/new system server 130 after the system migration. In the process of interacting with the old/new system server, the electronic client device 110 may issue a request to the old/new system server through the GUI displayed on the electronic client device 110. Upon receiving the request from the electronic client device 110, the old system server 120 or the analytic server 130 may execute one or more component software models and return the requested services to the electronic client device 110.

In some embodiments, the electronic client device 110 may be interacting with the old system server 120 and the analytic server/new server 130 through a third server (not shown) that can facilitate the connection. For example, the third server (not shown) may host a website or any other interactive graphical user interface provided and displayed on the electronic client device 110 that allows the user to interact with the old system server 120 before system migration and interact with the new system server 130 after system migration (e.g., allows the user to log in and have access to the user account).

The original user account database 120a may be any non-transitory machine-readable media configured to store user account data, including user identifiers, user accounts, and user credentials such as passwords, certificates and biometrics. The old system server 120 may comprise, or may be in network-communication with the original user account database 120a. The user may issue a login request through the electronic client device 110. For example, the user may enter credential information such as username and password. Before the system migration, the electronic client device 110 may transmit the user inputs to the old system server 120 for authentication. The old system server 120 may access the original user account database 120a configured to store user credentials, which the old system server 120 may reference in order to determine whether a set of credentials (purportedly authenticating the user) match an appropriate set of credentials that identify and authenticate the user. The user data in the original user account database 120a may be plaintext without any processing. When the old system server 120 authenticates the user, the old system server 120 may check if the input password is equal to the corresponding record stored in the database 120a. Alternatively, the old system server 120 may employ additional safeguards to protect the passwords. In some embodiments, the old system server 120 may hash or process the passwords before saving them into the original user account database 120a. For example, the old system server 120 may generate a string for each password by computing a hash value using the password and a salt value as inputs of the hash function and appending the salt value to the hash value. As a result, the original user account database 120*a* may store the user identifier, hashing algorithm, salt value, string corresponding to each password. During the system migration, the password data in the database 120*a* may be sensitive information and cannot be transmitted to the analytic server (new system server) 130 in plaintext.

The user account database 130*a* associated with the analytic server 130 may be any non-transitory machine-readable media configured to store user account data, including user identifiers, user accounts, and user credentials such as passwords, certificates and biometrics after the system migration. The analytic server 130 may comprise, or maybe in network-communication with the user account database 130*a*. As discussed above, the old system server 120 may not be able to transmit the user credential information such as passwords in plaintext to the analytic server 130. To protect the passwords, the old system server 120 may process the passwords using hash functions to produce a string for each password. The strings may be a sequence of characters. In some embodiments, the strings may be 64 bytes, though any length may be used and may be dependent upon the hash algorithm. It is not feasible to derive the password based on the corresponding string. During the system migration, the old system server 120 may transmit the strings to the analytic server (the new system server) 130 instead of the plaintext passwords. The analytic server 130 may initially store such strings and other data including the user identifier, hashing algorithm, salt value corresponding to each user into the user account database 130*a*. The analytic server 130 may use the strings for user authentication after the system migration when the user first logs into the new system server 130. Specifically, the analytic server 130 may extract the input password from GUI, and process the input password in the same way as the old system server 120 to compute a string. Only if the input password is correct, the computed string based on the input password would match the stored string. In other words, the process of generating a string for a password may guarantee that the same input value (e.g., password) may generate the same output value (e.g., string); two different inputs may generate different outputs.

When the analytic server 130 determines the computed string matches the stored string, the analytic server 130 may determine the user inputs the correct password and authenticate the user to access the account. In the meantime, the analytic server 130 may replace the stored string with the extracted password that is in plaintext format. Thus, the analytic server 130 may be able to obtain the plaintext password for each user over time. As a result, the system migration may be securely completed; the old passwords are retained without requiring the user to reregister; the new system may authenticate the users from the moment of system mitigation and retire the old system immediately.

Figure 2:
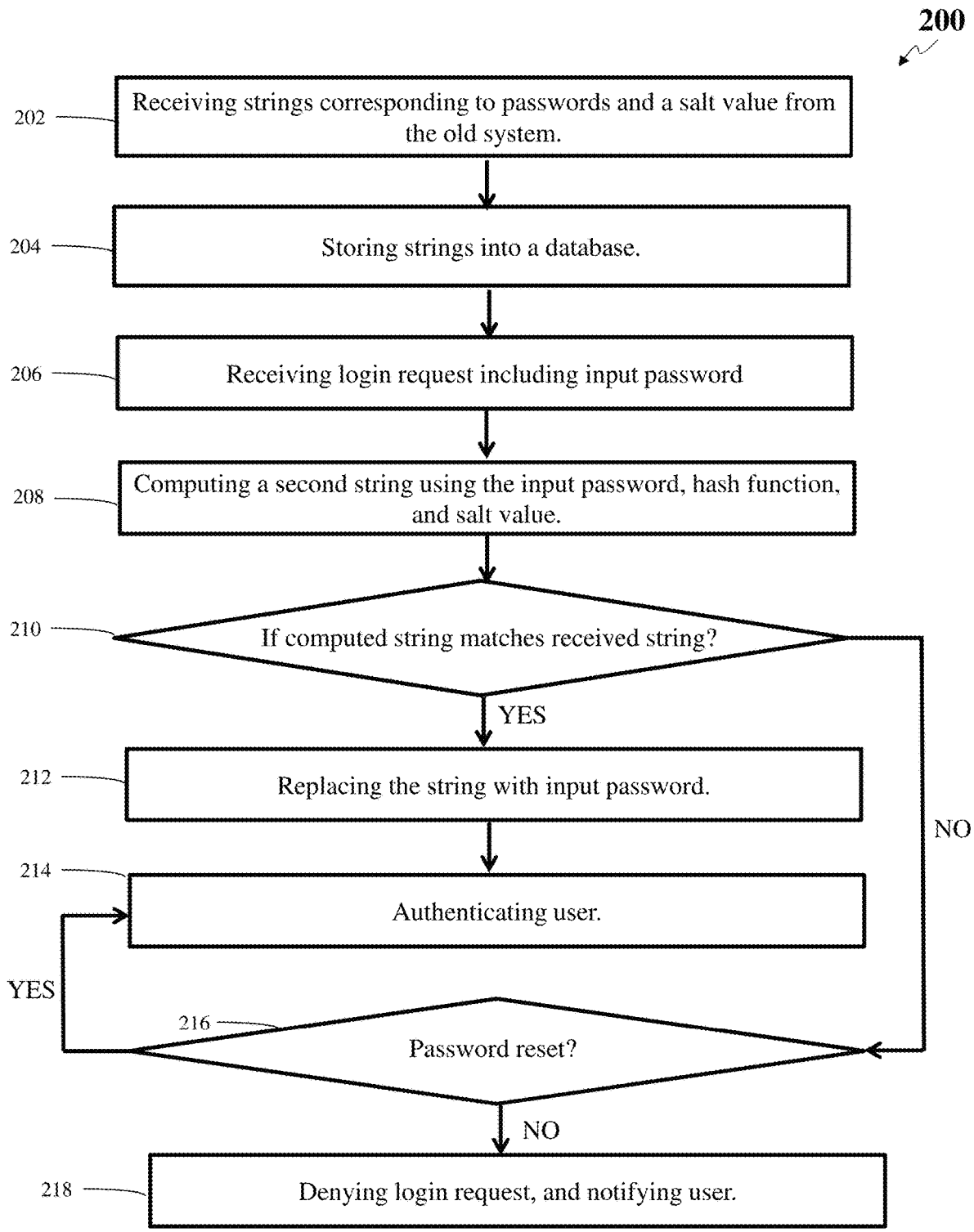
FIG. 2 illustrates a flowchart depicting operational steps for authentication data migration, according to an embodiment.

FIG. 2 illustrates execution of a method 200 for authentication data migration, according to an embodiment. Other embodiments may comprise additional or alternative steps, or may omit some steps altogether.

At step 202, the analytic server may receive strings corresponding to passwords and a salt value from the old system. In some embodiments, to protect the security of passwords, the old system may process the plaintext passwords using hash function and a salt value. More specifically, the old system server may use the password and the salt value as inputs of the hash function, and append the salt value to the end of the hash output to produce the string for each password (e.g., string=hash (password, salt value), salt value). In other words, the password and the salt value are appended and processed with a cryptographic hash function, and the resulting output, instead of the original password, is stored with the salt value in a database. The salt value is a randomly generated value for each password when the user sets the password. Hashing allows for later authentication without keeping the plaintext password, which is risky, e.g., in the event that the authentication data store is compromised (e.g., cyberattacks).

During the system migration, the analytic server/new system server may receive a copy of the strings from the old system server. The strings may represent hashed passwords. For example, the analytic server may receive user account information for each user, including user identifier (e.g., user account number, or username), string, and a salt value. The old system server may randomly generate a salt value for each password without placing a burden on the users. The analytic server may use different salt values when hashing each password. For example, two users with the same password may have different salt values, and thus different strings. Since the salt values may be different for each received password, they also protect commonly used passwords or those who use the same password in several sites, by making all salted hash instances for the same password different from each other. Because the salt value is appended after the hashing process, the salt value is accessible to the analytic server, so that the analytic server may be able to recalculate the strings for user authentication. Moreover, the hash function is a one-way function, thus it is infeasible to derive the hashing input (password) based on the hashing output (string) even the salt value is known. The hashing process may be able to protect the passwords. In one or more embodiments, the hash function may be one of SHA-0, SHA-1, SHA-2, and SHA-3.

At step 204, the analytic server may store the strings and salt values into a user account database. The database may comprise fields of user identifier (e.g., user account number, or username), password, hash algorithm, and salt value. The database may initially store the user account data received from the old system server. The field of password may initially store the received string of the hashed password, but the analytic server may update the field with the actual password (e.g., plaintext password). For example, the analytic server may seize/extract the actual password during user login process. When the analytic server determines the input password is correct during user authentication, the analytic server may update the field of password by replacing the string of hashed password with the actual plaintext password. In addition, the database may include an additional field for update status that indicates whether the analytic server has updated the string. For example, the initial value for the update status field may be a Boolean value "false." After the analytic server updates the string with the actual password, the analytic server may update the status field to be "true." Therefore, by checking the status field, the analytic server may determine whether the field of password stores the hashed password or the actual plaintext password, and further determine the authentication method.

At step 206, the analytic server may receive a login request from a user. After the system migration, when the user logs in for the first time, it may be the analytic server (new system server) receives the login request. The login request may include the user identifier (e.g., user account number, or username) and the input password. For example, the electronic client device may execute an Internet browser or local application that includes a login graphical user interface (GUI). The user may input the username into a text-based box and the password into a second text-based box included in the GUI and click on the button "sign in." The electronic client device may transmit the request including the user inputs to the analytic server. The analytic server may extract the inputted username and password from the request. Based on the inputted username, the analytic server may determine the user identifier and query the corresponding record for the specific user from the user account database, including the salt value, hash function and the string data. Furthermore, based on the input password, the analytic server may authenticate or deny the user by determining if the input password is correct.

At step 208, the analytic server may compute a second string using the input password, the hash function and the salt value. As discussed above, the analytic server may receive the salt value and hash function by querying the user account database based on the user identifier. The analytic server may extract the input password from the received login request, and the input password may be in plaintext format. The analytic server may compute the second string using the extracted password and the received salt value. For example, the second string may be represented as string'=hash (input password, salt value), salt value.

At step 210, the analytic server may determine if the second string (e.g., string') computed based on the input password matches the stored string (e.g., string). As discussed above, the analytic server may query the corresponding record for the specific user from the user account database, including the salt value and the string data. The string data from the user account database is the stored string (e.g., string) that may represent the hashed actual password. The computed second string from step 208 may represent the hashed input password. The analytic server may compare the stored string (e.g., string) and the computed second string (e.g., string') to determine if they match. Since the analytic server computes the second string in the same way as the old system server computes the stored string with the same salt value and hash function, the stored string and the computed string should match if the input password is equal to the actual password. Therefore, when the analytic server determines the second string computed based on the input password matches the stored string, the analytic server may determine that the user has input the correct password, and the process may go to step 212; otherwise the analytic server may determine that the user has input wrong password, and the process may go to step 216.

At step 212, the analytic server may replace the stored string with the input password. Because the analytic server may receive the input password in plaintext form, once the analytic server determines that the input password is equal to the actual password, the analytic server may obtain the actual plaintext password. Furthermore, the analytic server may replace the stored string (hashed password) with the actual plaintext password in the user account database. In this way, the analytic server may retain the old password during the security system migration. In the following authentication, the analytic server may simply compare the password inputted by the user in the login GUI with the password stored in the user account database without computing the string. In other words, the analytic server may only need to compute a string based on the input password, hash function, and salt value; compare the computed string with stored string for authentication when the user logs in for the first time. Once the analytic server authenticates the user, in the following login authentication for the same user, the analytic server may compare the passwords in plaintext form without computing the string. Thus, the authentication process is more efficient. In one or more embodiments, the analytic server may complete the migration of passwords after the analytic server replaces each stored string with the input password.

In addition, the analytic server may also update the field of update status in the user account database by changing the Boolean value from "false" to "true." In one or more embodiments, the field of update status may indicate whether the field of password is updated with plaintext passwords. During the system migration, the user account database may initially store the strings of hashed passwords in the field of password; accordingly, the field of update status may initially be "false." After the analytic server replaces the string with the actual plaintext password after the user logs in for the first time, the analytic server may change the field of update status to be "true" indicating the field of password is updated and stores the plaintext password.

In one or more embodiments, the analytic server may first check the field of update status upon receiving login requests from the electronic client device. Based on the update status, the analytic server may determine the method for user authentication. For example, if the update status is with the value of "false," the analytic server may determine that the login request is a first time login request or the analytic server has not authenticated user before and the password field stores the string. The analytic server may authenticate the user by computing a second string and comparing the strings. If the update status is with the value of "true," the analytic server may determine the analytic server has authenticated the user before and the password field stores the plaintext password. The analytic server may authenticate the user by comparing the plaintext passwords.

At step 214, the analytic server may authenticate the user. When the analytic server determines the input password is correct, the analytic server may authenticate the user by allowing the user to login and access the account. After login, the user may be able to perform any operations or issue any requests provided in the account services.

At step 216, the analytic server may determine if the user has reset the password. In case the analytic server determines the user has input the wrong password, the analytic server may further determine if the user has reset the password. For example, the login request may not be the first time for the user to login. Instead, the user may have successfully logged in before and reset the password. The analytic server may have updated the password field of the user account database. The data stored in the field of the password may not be the string of hashed original password, but the rest password. To determine if the input password is correct, the analytic server may simply compare the rest password stored in the password field of the database with the input password extract from the login request. If they match, the analytic server may determine that the user has input the correct password, the process may go to step 214 to allow the user access the account; otherwise, the analytic server may determine that the input password is not correct, the process may go to step 218.

At step 218, the analytic server may deny the login request and notify the user. For example, the analytic server may generate a GUI (e.g., a dialog box) notifying the user the authentication fails as the password is incorrect and ask the user to try again. In some embodiments, the analytic server may reset text boxes of username and password to be blank for the user to try again. In operation, the analytic server may deny the login request by not allowing the user to access the account services and serve the same login web page or GUI.

Example

In a non-limiting example, the analytic server may be required to migrate a set of passwords (or other data) from an old server to a new server (e.g., analytic server). As described above, for security reasons, it may be not always secure to directly transfer the alphanumerical characters representing each user's password from the old system to the new system in plaintext. In this example, the analytic server may receive the encrypted string of alphanumerical characters representing each password generated using the hashing algorithms and salt values described above. The encrypted string of alphanumerical characters may then be stored in a new database associated with the new server. This encrypted string of alphanumerical characters minimizes the risk of data compromise in case of a cyber-attack while migrating user data.

When user's encrypted string of alphanumerical characters representing the user's password is migrated to the new sever (e.g., analytic server), a user may request access to his or her accounts. As a result, the analytics server may receive an authentication request from a user. The analytic server may then prompt an input field configured to receive the user's authentication data and may receive a plaintext of alphanumerical characters from the user (e.g., purportedly the user's password). The analytic server may then retrieve the hashing algorithm that was used for the user's password encryption and may encrypt the received alphanumerical characters using the retrieved encryption method. When the newly encrypted string of alphanumerical characters matches the encrypted data stored in the new database, the analytics server may grant access to the user. The analytics server may also replace the encrypted data in the new database with unencrypted alphanumerical characters received from the user.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for transferring authentication data from a first server to a second server, comprising:
   receiving, by the first server and from the second server, a set of strings corresponding to a plurality of users' authentication data, wherein each string corresponds to each user's authentication data and is a hash value generated by the second server based at least on each user's authentication data;
   receiving, by the first server, an authentication request from a user of the plurality of users, wherein the authentication request comprises at least a user identifier and authentication data;
   querying, by the first server from a database storing the set of strings received from the second server, a first string corresponding to the user's authentication data based on the user identifier;
   generating, by the first server, a second string corresponding to the user's authentication data by applying a hashing algorithm to the user's authentication data and a salt value associated with the user;
   comparing, by the first server, the first string and the second string to determine whether the first string matches the second string;
   upon the first string matching the second string:
      authenticating, by the first server, the user by granting the user access to a user account associated with the user identifier; and
      replacing, by the first server, the first string with the user's authentication data in the database; and
   wherein the second server is retired once at least a portion of the plurality of users' authentication data has been transferred to the first server.

2. The method of claim 1, further comprising:
   upon the first string does not match the second string,
      determining, by the first server, if the authentication data is reset by the user; and
      upon determining the authentication data is not reset, notifying, by the first server, the user that authentication fails.

3. The method of claim 1, wherein the first server is a new server, the second server is an old server, and a system migrates from the old server to the new server.

4. The method of claim 1, wherein the hashing algorithm is one of SHA-0, SHA-1, SHA-2, and SHA-3.

5. The method of claim 1, wherein the salt value is a randomly generated value.

6. The method of claim 1, wherein the set of strings are character strings.

7. The method of claim 1, wherein the authentication data is a password in plaintext format.

8. The method of claim 1, further comprising,
   completing, by the first server, authentication data migration after each of the set of strings is replaced by the corresponding authentication data.

9. The method of claim 1, wherein the second string is computed by using the authentication data and the salt value as inputs of the hashing algorithm, and appending the salt value to the hash value.

10. The method of claim 1, further comprising:
    updating, by the first server, a field in the database to indicate the first string is replaced with the authentication data.

11. A system for transferring authentication data from a first server to a second server, comprising:
    a second server; and
    a first server in communication with the second server and configured to:
       receive, from the second server, a set of strings corresponding to a plurality of users' authentication data, wherein each string corresponds to each user's authentication data and is a hash value generated by the second server based at least on each user's authentication data;
       receive an authentication request from a user of the plurality of users, wherein the authentication request comprises at least a user identifier and authentication data;
       query, from a database storing the set of strings received from the second server, a first string corresponding to the user's authentication data based on the user identifier;
       generate a second string corresponding to the user's authentication data by applying a hashing algorithm to the user's authentication data and a salt value associated with the user;
       compare the first string and the second string to determine whether the first string matches the second string;
       upon the first string matching the second string:
          authenticate the user by granting the user access to a user account associated with the user identifier; and
          replace the first string with the user's authentication data in the database; and
    wherein the second server is retired once at least a portion of the plurality of users' authentication data is transferred to the first server.

12. The system of claim 11, wherein the first server is further configured to:
    upon the first string does not match the second string,
       determine if the authentication data is reset by the user; and
       upon determining the authentication data is not reset, notify the user that authentication fails.

13. The system of claim 11, wherein the first server is a new server, the second server is an old server, and a system migrates from the old server to the new server.

14. The system of claim 11, wherein the hashing algorithm is one of SHA-0, SHA-1, SHA-2, and SHA-3.

15. The system of claim 11, wherein the salt value is a randomly generated value.

16. The system of claim 11, wherein the set of strings are character strings.

17. The system of claim 11, wherein the authentication data is a password in plaintext format.

18. The system of claim 11, wherein the first server is further configured to complete authentication data migration after each of the set of strings is replaced by the corresponding authentication data.

19. The system of claim 11, wherein the second string is computed by using the authentication data and the salt value as inputs of the hashing algorithm, and appending the salt value to the hash value.

20. The system of claim 11, wherein the first server is further configured to update a field in the database to indicate the first string is replaced with the authentication data.

\* \* \* \* \*